(12) United States Patent  
Topacio (10) Patent No.: US 9,995,420 B1  
(45) Date of Patent: Jun. 12, 2018

(54) FIRE ENGINE HOSE CONNECTOR

(71) Applicant: Eric Topacio, San Diego, CA (US)

(72) Inventor: Eric Topacio, San Diego, CA (US)

(*) Notice: Subject to any disclaimer, the term of this patent is extended or adjusted under 35 U.S.C. 154(b) by 0 days. days.

(21) Appl. No.: 15/419,134

(22) Filed: Jan. 30, 2017

(51) Int. Cl.
*F16L 27/04* (2006.01)
*F16L 29/00* (2006.01)
*F16L 15/00* (2006.01)
*F16K 17/04* (2006.01)

(52) U.S. Cl.
CPC ............ *F16L 29/007* (2013.01); *F16K 17/04* (2013.01); *F16L 15/006* (2013.01); *F16L 27/04* (2013.01)

(58) Field of Classification Search
CPC ....... F16L 15/006; F16L 27/04; F16L 29/007; F16K 17/04
USPC .................... 251/149.9; 285/82, 87, 317, 320
See application file for complete search history.

(56) References Cited

U.S. PATENT DOCUMENTS

| | | | | |
|---|---|---|---|---|
| 4,295,670 A * | 10/1981 | Goodall | ................... | F16L 37/18 285/312 |
| 4,566,489 A * | 1/1986 | Knapp | ................... | F16L 37/252 137/15.22 |
| 4,722,555 A | 2/1988 | Soultatis | | |
| 4,982,929 A * | 1/1991 | Spurling | ................... | F16L 37/18 251/149.9 |
| 5,535,984 A | 7/1996 | Anderson et al. | | |
| 5,947,530 A | 9/1999 | Harle | | |
| 5,988,693 A * | 11/1999 | Street | ................... | F16L 37/18 285/312 |
| 6,328,270 B1 * | 12/2001 | Elberbaum | ............. | F16L 27/04 248/288.31 |
| 6,382,247 B1 | 5/2002 | Gundry | | |
| 6,447,027 B1 | 9/2002 | Lilley et al. | | |
| 6,450,542 B1 | 9/2002 | McCue | | |
| 6,843,506 B2 | 1/2005 | Osborne | | |
| 7,021,345 B2 | 4/2006 | Webb | | |
| 7,255,131 B2 | 8/2007 | Paper et al. | | |
| 7,878,556 B2 | 2/2011 | Gammons | | |
| 8,074,959 B2 * | 12/2011 | Sledz | ................... | F16K 35/025 251/111 |
| 8,827,320 B2 | 9/2014 | Topacio | | |
| 8,875,375 B2 | 11/2014 | Topacio | | |
| 2006/0174968 A1 | 8/2006 | DeLuna | | |
| 2007/0145740 A1 * | 6/2007 | Jou | ........................ | F16L 27/023 285/261 |
| 2007/0157972 A1 | 7/2007 | Hendey | | |

(Continued)

*Primary Examiner* — Mary McManmon
*Assistant Examiner* — Jonathan Waddy
(74) *Attorney, Agent, or Firm* — Mark Wisnosky (57) ABSTRACT

A fire engine hose connector system and a method for using the system are reported. The system allows for rapid connection between the fire hose and the fire engine, and more importantly the system enables even more rapid disconnection. The fire engine and firefighting personnel may make a rapid escape form an overtaking wildfire. The ability to rapidly disconnect and escape from the fire scene allows the fire engine and personnel to access hydrant supplies that would otherwise not be available due to safety procedures that preclude connection when the long disconnect time requirements of prior art connectors place the escape of the fire engine and personnel at risk in a rapidly moving fire. The connector further includes a means to bend the connector for stress relief and ease of handling and multiple safety interlocks.

2 Claims, 11 Drawing Sheets

(56) References Cited

U.S. PATENT DOCUMENTS

2008/0284165 A1* 11/2008 Chiang ................ F16L 21/002
  285/261
2011/0163532 A1* 7/2011 Topacio .............. F16L 37/0847
  285/33

* cited by examiner

FIRE ENGINE HOSE CONNECTOR

CROSS-REFERENCE TO RELATED APPLICATIONS

Not applicable.

BACKGROUND OF THE INVENTION

Technical Field

The present invention relates to a quick-disconnect connector useful for connecting a fire engine to a fire hydrant.

Related Background Art

Brush fires are common throughout the southwestern United States as well as many other parts of the world. Often driven by strong desert winds these fires can consume thousands of acres of brush and destroy homes and other buildings in their paths. Winds in Santa Ana conditions in portions of Southern California can often reach 50 mile per hour and even higher in gusts. The shifting direction of these winds, especially on a local scale can result in unpredictable and rapidly changing direction for the driven fires. These winds drive the fires at such velocity that fire fighters are often in danger of being overrun by the fire they are on the ground to fight. The fires are fought with aerial drops of water and fire retardant, earth moving equipment and other mechanized means. However the primary weapon against these fires is still the firefighting crew on the ground using hand tools to create firebreaks and conventional fire pumper engines and water to douse the blaze. The priority is often to provide sufficient water on the fire or on homes in the path of the fire. These wildfires are not confined to remote forests or scrubland. Fires regularly erupt in populated areas. In these cases the availability of fire hydrants as a supply of water can be a great aid and lifesaver for the fire fighting crew. Otherwise the water supply of the ground crew is limited to what can be carried in the tank of a fire engine, typically 500 gallons. However, even when available the fire hydrants are not always used. The fire fighting crew must be ready to evacuate an area if the fire shifts or is simply overwhelmingly large and fast moving. The evacuation of an area must often be done very quickly. There is often not time to disconnect fire hoses from supply hydrants. This evacuation safety requirement often precludes connecting to a hydrant supply even when they are available. The time required to return to the hydrant, turn off the flow and disconnect the hose at least from the engine may be too long and cost lives. Safety procedures to ensure the safety of the fire fighting crew dictated by the restrictions of heretofore available equipment mean that fires are often fought just with the water that can be carried on the fire engine even when a hydrant supply is available. A means is needed to easily and rapidly connect and just as importantly disconnect a fire hose connection between a hydrant and a fire engine water supply inlet.

There have been improvements that address connections to a fire hydrant or to a fire engine but do not provide a solution to the problem of rapid disconnect without returning to the hydrant to stop the flow. The connection of a fire hose to a hydrant is facilitated by quick-connect fittings such as the Storz fitting described in U.S. Pat. No. 489,107. However this fitting allows just a rapid mechanical connection of the hose to the hydrant but does not address the issue of water flow. A Storz or similar fitting can also rapidly connect and disconnect from the fire engine. However the hose cannot be connected or disconnected to the hydrant with the hydrant turned on. Disconnecting the hose at the engine with the hose under pressure is not possible with current equipment. U.S. Pat. No. 6,447,027 similarly addresses the issue of rapidly connecting a hose to a fire hydrant. This invention also does not address the issue of rapidly disconnecting the hose. Other inventions such as U.S. Pat. No. 7,255,131 address aspects of connections to the fire hose but again do not solve the problem of rapidly disconnecting a hose from a fire engine. U.S. Pat. Nos. 8,827,320 and 8,875,375 represent earlier embodiments of the invention. The inventor has improved these earlier versions in what follows. There is a need for a rapid hose connection that can be easily and rapidly attached to and detached from a fire engine without the requirement of returning to the hydrant to turn off the flow.

DISCLOSURE OF THE INVENTION

The invention comprises a quick-disconnect connector that incorporates an integrated valve to allow water flow from the source side to be controlled on the source side of the connection to the fire engine. Thus, the quick-disconnect connector comprises a coupler that is adapted to fit to the standard connection on a fire engine water supply inlet and an adapter that provides a standard connection to a fire hose. The adapter also includes an integrated valve, which may be operated by means attached to either piece of the quick connect fitting. Typically both the fire hose connection and the fire engine connection are 2.5-inch or 4-inch diameter connections, but this dimension does not represent a size constraint on the invention. Other size connections for different hose and fire engine fittings can equally well be practiced under the invention.

Operation of the system follows attachment of the coupler to the fire engine water supply inlet fittings using appropriate fittings. A fire hose is attached to a hydrant using normal fittings known to those skilled in the art. The distal end of the fire hose is then attached to the adapter using an appropriate fitting. The integrated valve is initially in the closed position and the adapter is mated with the coupler on the fire engine inlet. The water supply at the hydrant is then turned on and the integrated valve is subsequently opened. Water flows from the hydrant through the quick-disconnect connector into the engine manifold, storage and pumping system. Disconnecting the system in an emergency such as being quickly overrun by a wildfire requires simply shutting the integrated valve off at the quick-disconnect connector and releasing the quick-disconnect fitting. The hose may then be left under pressure and temporarily abandoned as the engine drives away from danger. Disconnection is rapid because there is no need to leave the immediate vicinity of the engine, no need to go to the hydrant and stop the flow and relieve the pressure prior to disconnecting the hose at the engine.

BRIEF DESCRIPTION OF THE DRAWINGS

The novel features characteristic of the invention are set forth in the claims. The invention itself however as we all as the preferred mode of use, and further objects and advantages thereof, will best be understood by reference to the following detailed description of an illustrative embodiment when read in conjunction with the following drawings. Same features are numbered consistently throughout.

MODES FOR CARRYING OUT THE INVENTION

A connector and method of use that allows rapid connection, and in some cases more importantly, disconnection of a fire hose supply line between a hydrant and a fire engine is described. The connector allows rapid connection for quick set up and in an emergency may be disconnected from the engine to allow it to drive away without the need to return to the hydrant to shut off the supply or drain the fire hose.

Figure 1:
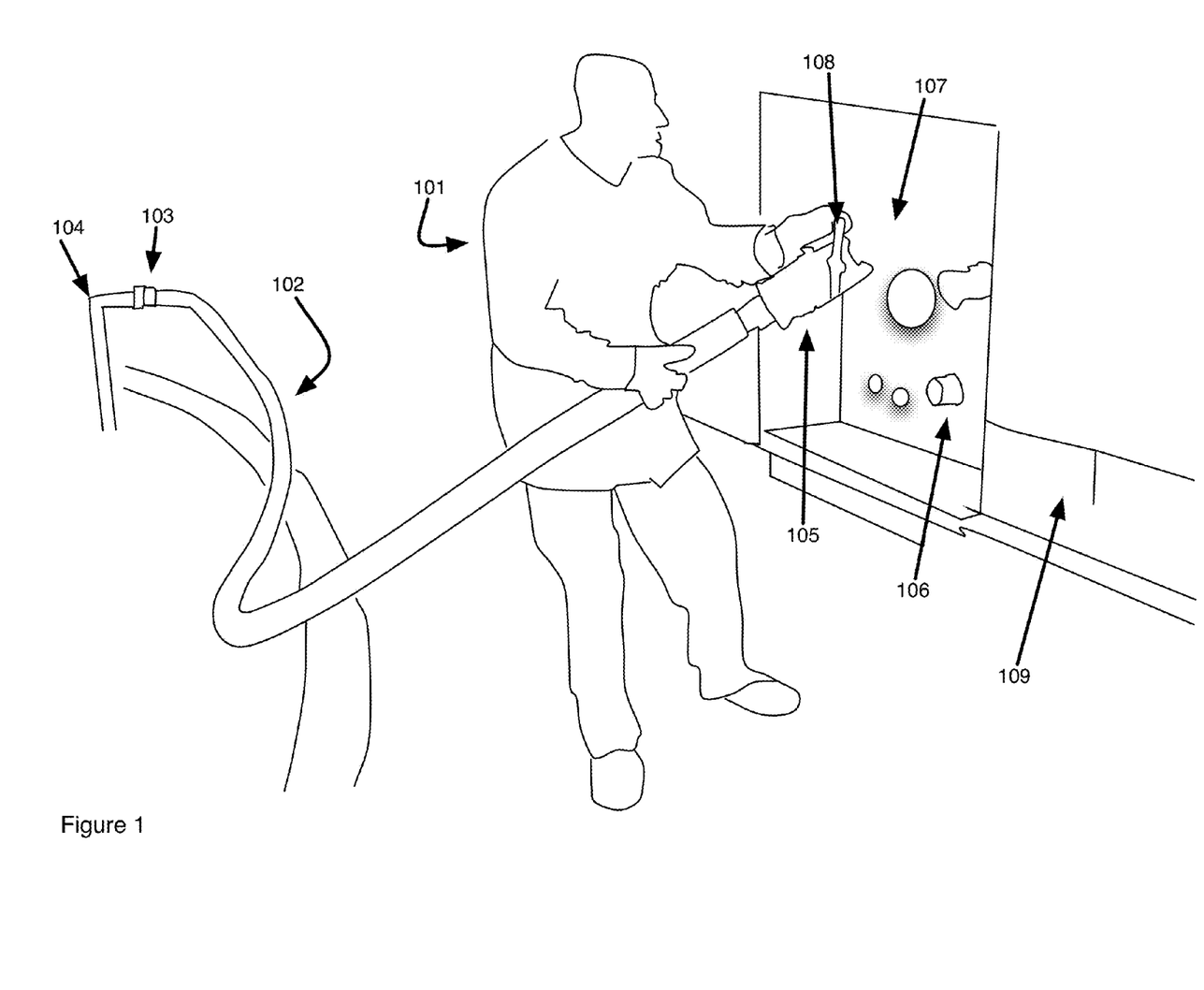
FIG. 1 shows the fire engine hose connector being connected between a supply hose and the supply inlet of a fire engine.
Figure 2:
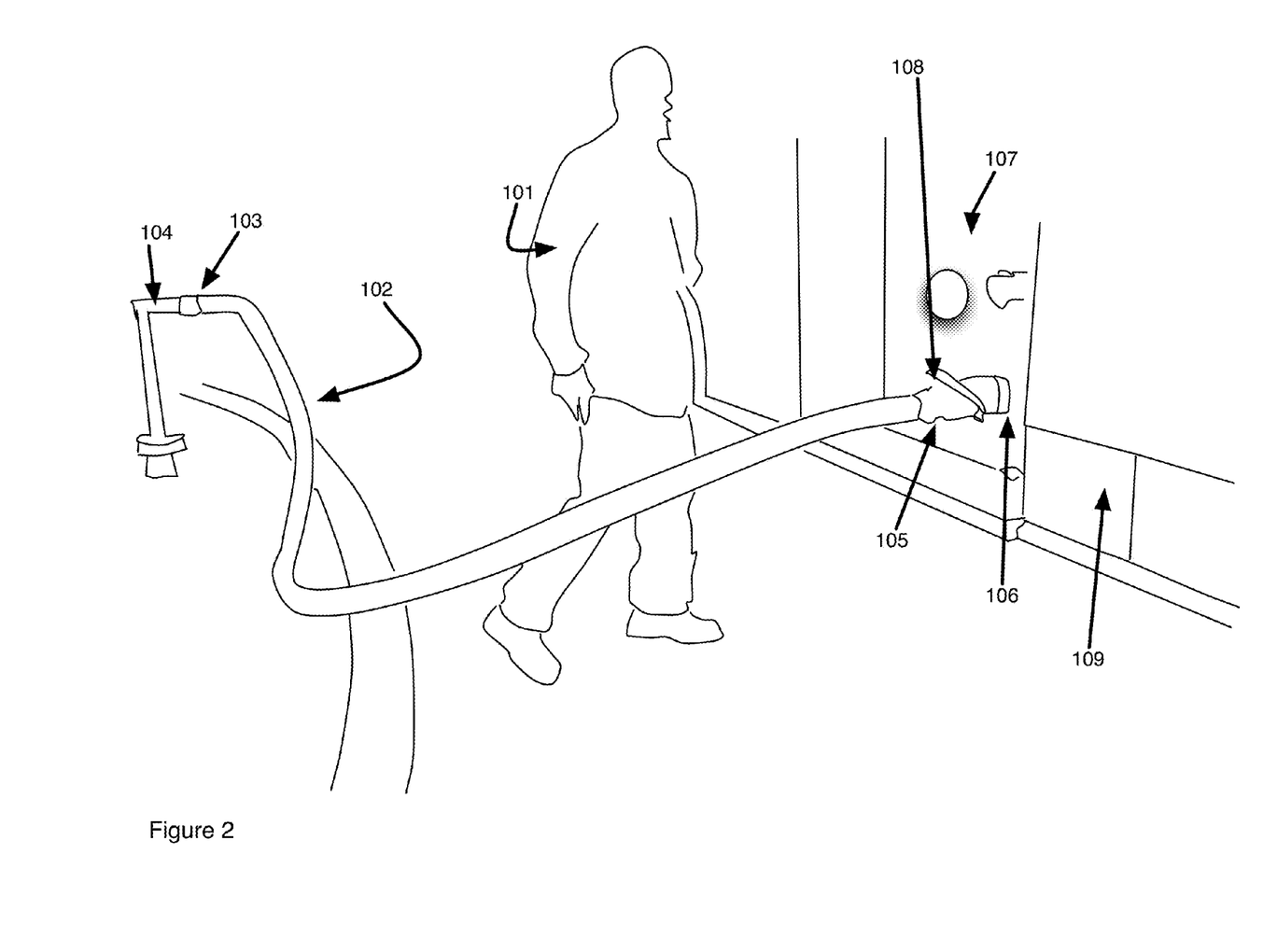
FIG. 2 shows the fire engine hose connector connected to the fire engine.

Referring to FIG. 1, a fireman 101 is in the process of attaching a fire hose 102 to a fire engine 109 using the invented fire engine hose connector. The fire engine hose connector is comprised of two parts. A first valve housing with connector 105 that is attached to the end of the fire hose 102 using standard fire hose fittings and a second fitting 106 that includes a quick disconnect fitting that mates with the valve housing 105 and further includes a tilt capability shown in later Figures. The hose is connected at the distal end 103 to a fire hydrant 104 again using standard fittings. At the hydrant end the connection is made through a Storz connector or similarly threaded connector and adapter to attach the hose to the hydrant as is known in the art. The hose may be either charged or not charged with water pressure. The valve actuator 108 is shown in the closed position as would be used to connect the valve housing 105 to the fitting 106. The fitting 106 has a first end that attaches to standard fittings on the water input panel 107 of the fire engine and a second end that has a quick disconnect fitting that mates with the valve housing 105. FIG. 2 shows the fire engine hose connector as attached to the fire engine 109. The method of attaching is to attach the first distal end 103 of the fire hose 102 to a fire hydrant 104. The valve is in the closed position as shown in FIG. 1. The valve housing is mated with and latched to the fitting 106 and the valve actuator 108 is then moved to the open position as shown in FIG. 2. Opening of the valve allows flow of water from the hydrant 104 through the hose 102 to the fire engine 109. The hose may be attached to the fire engine using the fire engine hose connector with the hose in either a charged, that is under pressure or a discharged state. The movement of the valve actuator 108 into the open position also simultaneously provides safety locking of the valve housing to the fitting 106. By engaging locking quick disconnect locking mechanisms and covering a water pressure relief valve to prevent accidental release of the connector 105 while open and under pressure and also preventing accidental release of water pressure with the valve actuator 108 in the open position. Details of the interlock features are shown in later Figures.

Figure 3:
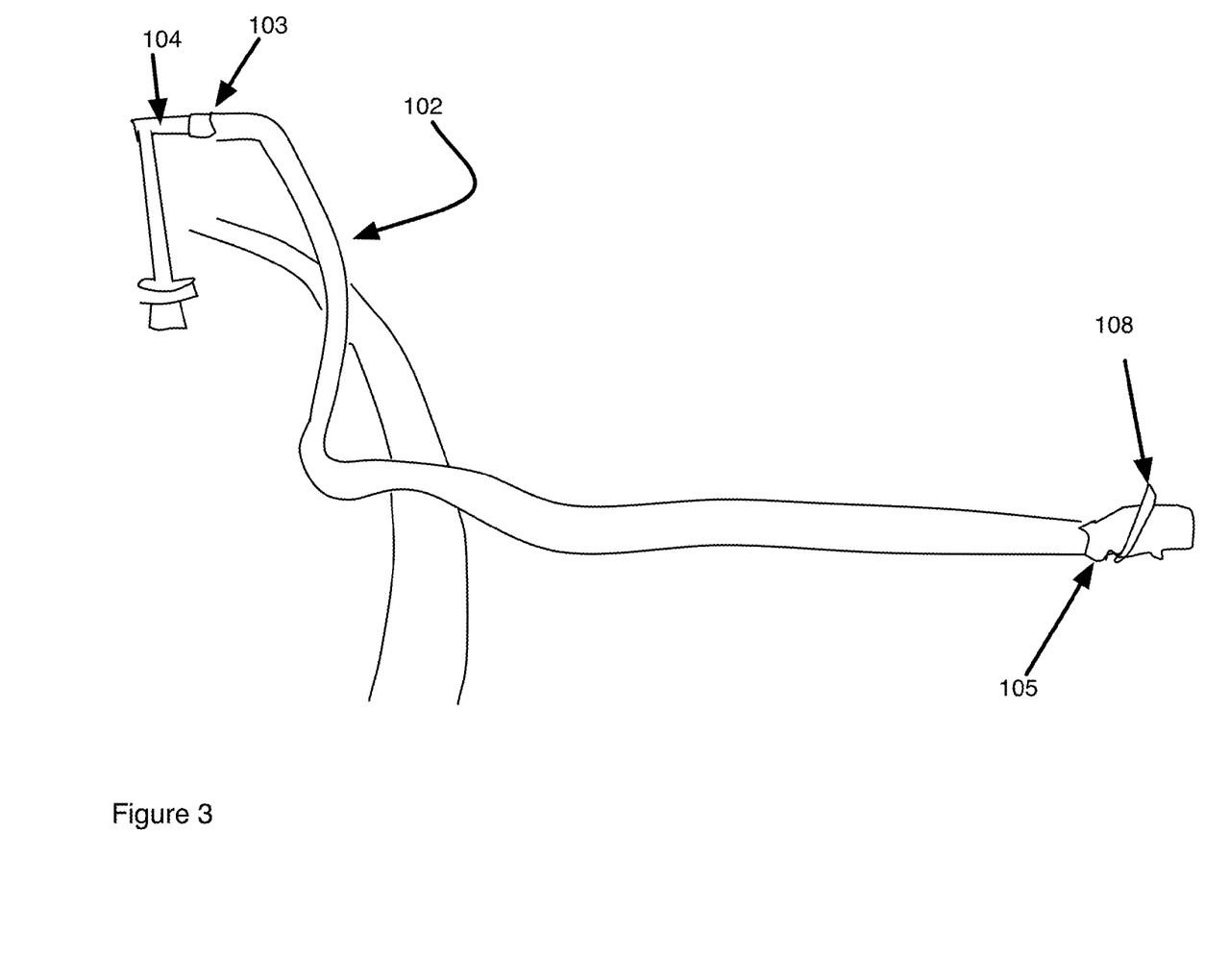
FIG. 3 shows the fire engine hose connector disconnected from the fire engine and left charged with water pressure.

The fire engine hose connector is disconnected from the fire engine with the reverse actions. The valve actuator 108 is moved to the closed position thereby exposing the latches for the quick disconnect and the pressure relief. The pressure relief button is pushed, relieving the water pressure within the valve body and the latches are released thus freeing the valve housing 105 from the connector 106. The hose may then be placed on the ground and the fire engine moved 109 away. The hose 102 may be left in the charged state lying on the ground until the fire engine can safely return to the area. FIG. 3 shows the fire hose and fire engine hose connector as it could be left if it was necessary for the fire engine to evacuate the region of the fire hydrant 104 such as frequently occurs in wild fire situations.

Figure 4A:
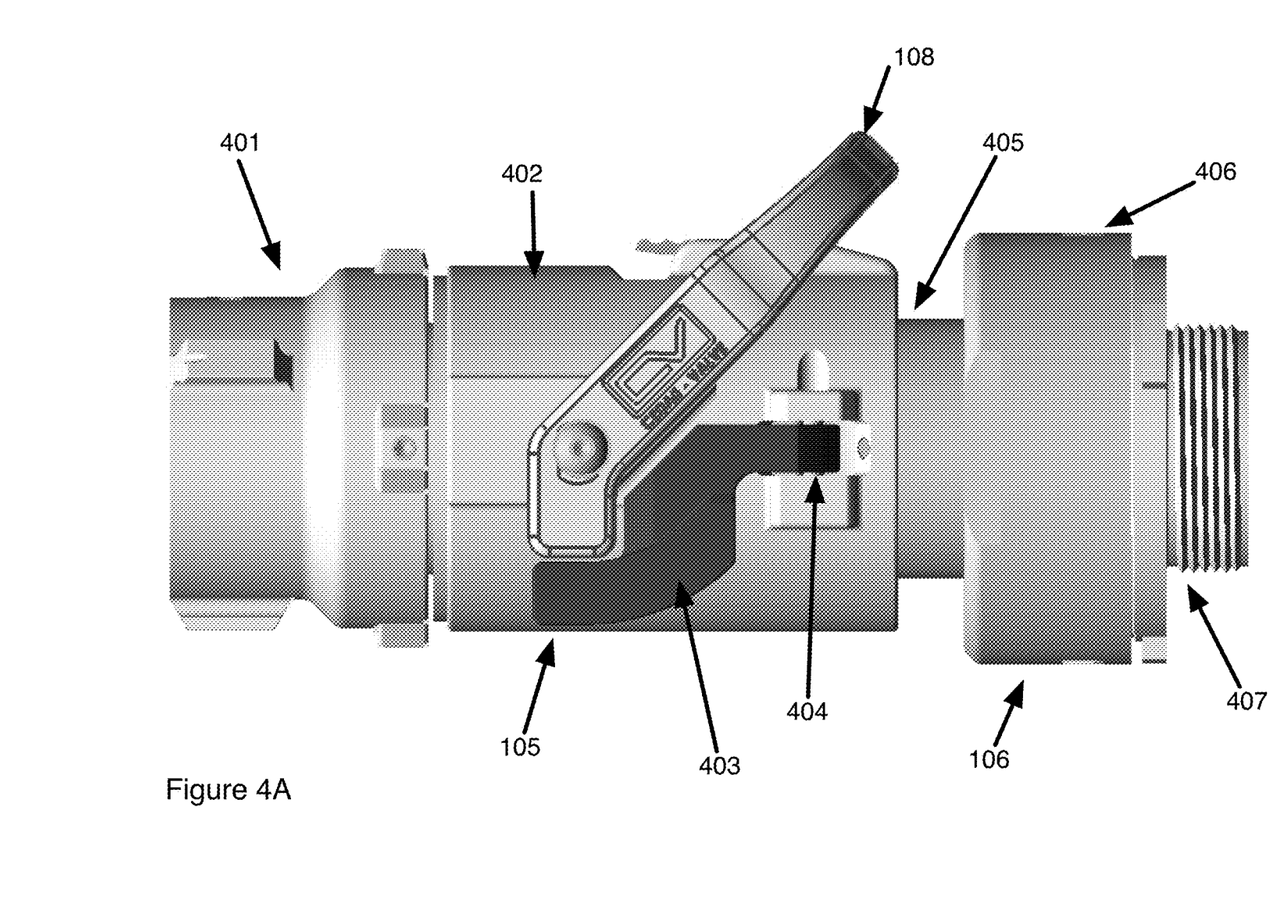
FIG. 4A shows a right side view of an embodiment of the fire engine hose connector with the valve in the closed position.

FIG. 4A shows a right side view of the fire engine hose connector. The device is comprised of a valve housing 105 and a connector 106. Both parts are essentially cylindrical. The valve housing 105 includes a U shaped handle 108 that is used to actuate the valve and at the same time provide safety interlocks that prevent accidental release of the fire engine hose connector when under pressure. The U-shaped handle in the figure is shown in the closed position. The valve housing further includes a first end that includes a connector 401 that connects to the end of a fire hose using standard connectors that are known in the art. The main body of the valve housing 402 includes a ball valve on the interior (not seen in this Figure) that is actuated by the U-shaped handle 108. The main body further includes a pair of levers 403 that are attached to the housing 402 at a hinge 404 and when rotated out of the plane of the Figure release the quick disconnect end 405 of the connector 106 from the housing. The second lever is not seen in the drawing as it is on the opposite side of the housing 402. The connector 106 of the fire engine hose connector includes a male quick disconnect connector 405 that mates with a female quick disconnect connector (not seen) located within the housing 402. The connector further includes a flexing connector 406 that has on its interior a ball connector to allows a bending motion of the connector 406 relative to the axis of the fire engine hose connector and thereby relieving stress upon the hose connection 401 and the connection to the fire engine through the connector 407. The connector 407 is removably attached to the connector 106 and is chosen to match a fitting on the water intake panel of the fire engine as was shown in FIGS. 1-3. The connector 407 is interchangeable for use of the fire engine hose connector on a variety of intake manifolds. The interior of all parts and the allowed bending motion are illustrated in subsequent figures.

Figure 4B:
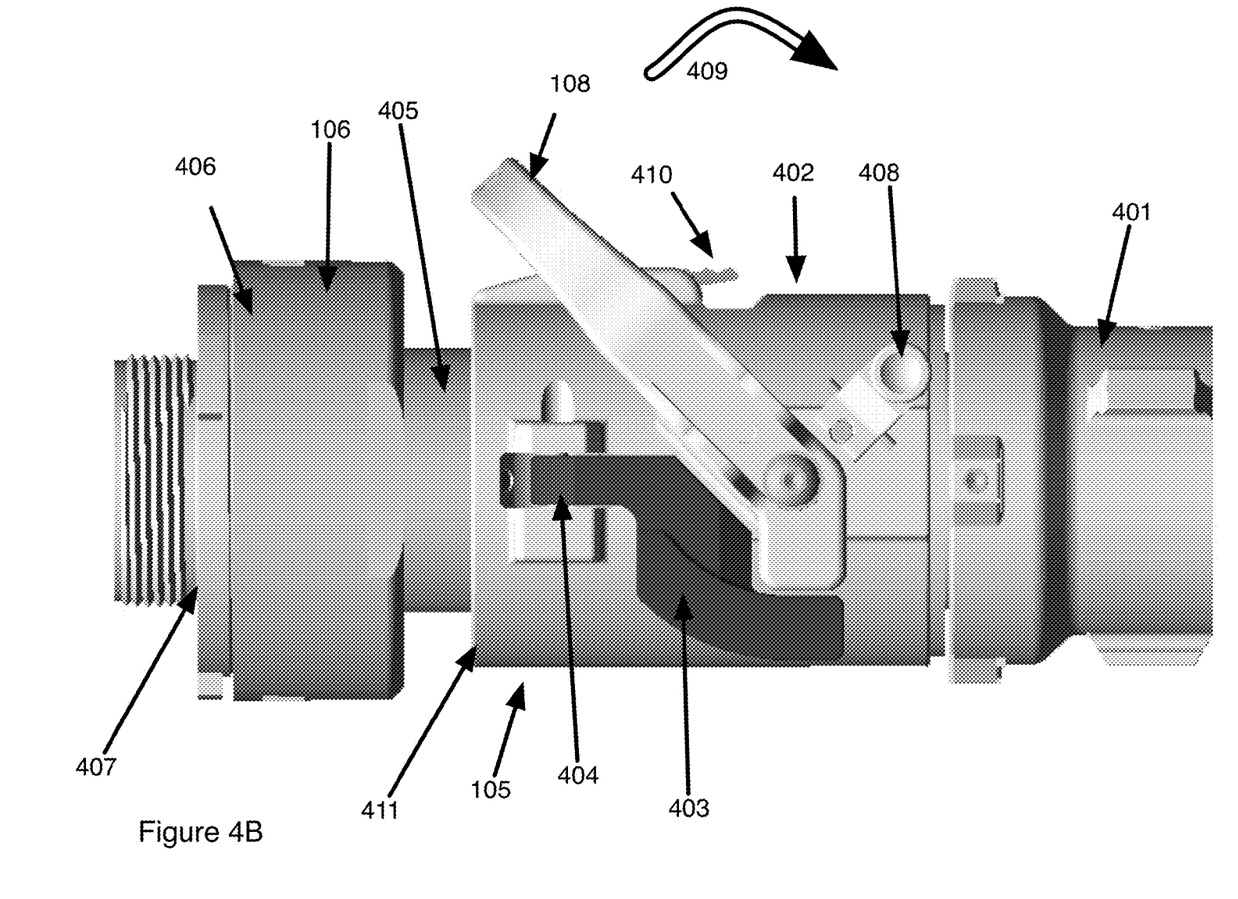
FIG. 4B shows a left side view of an embodiment of the fire engine hose connector with the valve in the closed position.

FIG. 4B shows a left side view of the fire engine hose connector. A pressure relief button 408 is seen in this view. The button when pressed opens a port into the housing 402 and allows the water pressure within the fire engine hose connector to be release prior to disconnecting the valve housing 105 from the connector 106. The handle 108 is again shown in the closed position. The ball valve within the housing 105 is opened by moving the handle 108 in the direction 409 as shown. Note that as the handle rotates to the fully open position the handle will overlap and block access to the pressure relief button 408 and overlap the release lever 403 thereby providing an interlock to prevent release of water pressure using the button 408 and an interlock to prevent movement of the release lever 403 and accidental release of the valve housing 105 from the connector 106. A third interlock includes a lever 410 that also must be pushed to release the valve housing 105 from the connector 106.

Figure 5:
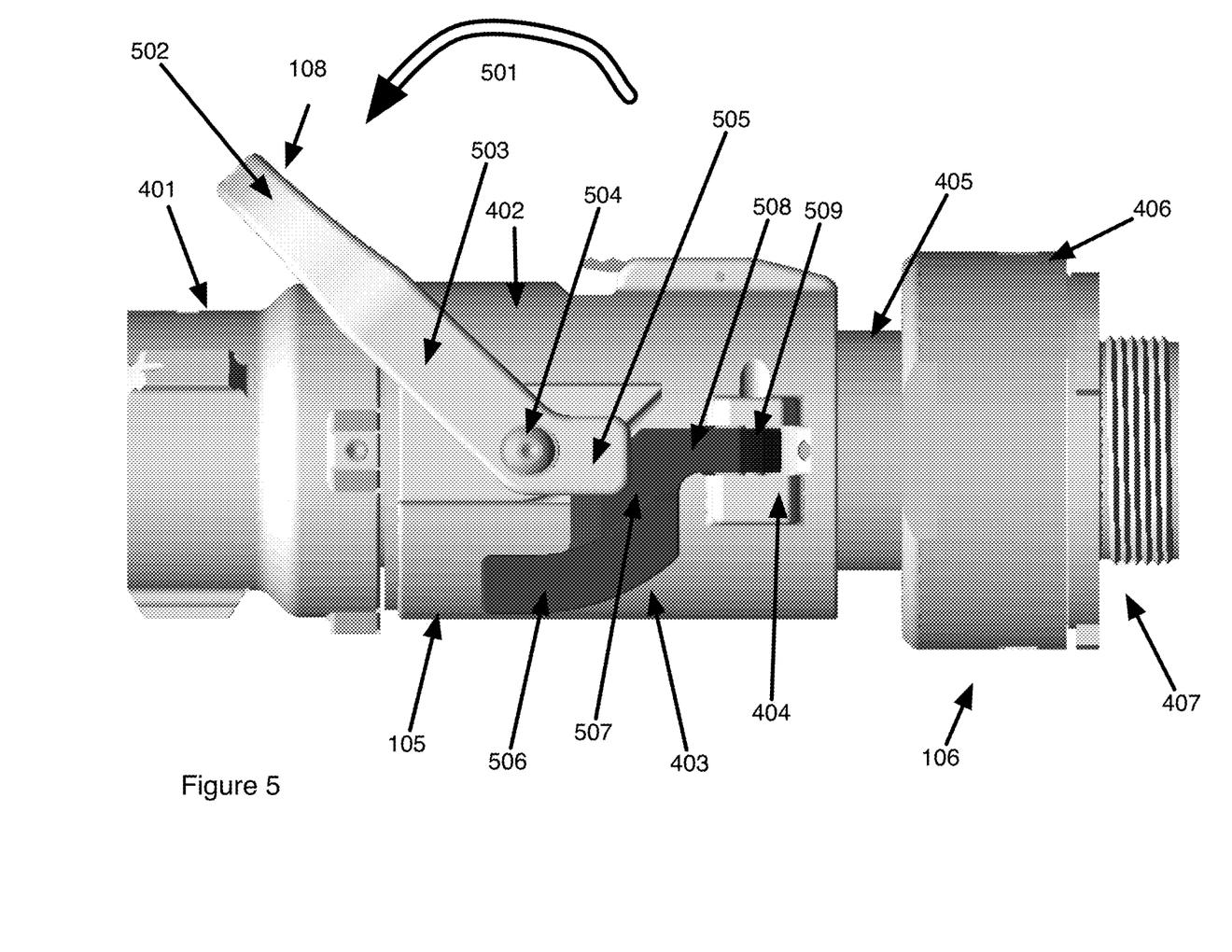
FIG. 5 shows a right side view of an embodiment of the fire engine hose connector with the valve in the open position.

FIG. 5 shows a right side view of the fire engine hose connector with the valve handle 108 moved in the direction 501 to open the ball valve within the housing 105. The handle is comprised of a top U-shaped portion 502 that is grasped by the user to move the handle into the open or closed position. The handle 108 further includes a straight side lever 503, a pivot point 504 where the handle is attached to the housing and the interior ball valve and an extension region 505. When in the open position as shown the straight side lever overlaps the release button on the left hand side of the housing as was seen in FIG. 4B. The extension region 505 overlaps an indented region 507 of the release lever 403 thereby preventing movement of the lever when the valve is open, as shown in the Figure, and preventing accidental release of the quick disconnect that holds the valve housing 105 to the connector 106. There is an equivalent configuration on the opposite left hand side of the fire engine hose connector that similarly prevents movement of the release lever on that side as well. The release lever 403 is comprised of a first end that includes a finger grip 506 for actuating the lever a indented locking region 507 that fits under the extension 505 on the valve handle 108 and a straight lever region 508 that terminates in a hinge 509 where the release lever penetrates the valve housing 105 through a sealed port 404 and the release lever when in the position as shown locks the quick disconnect portion 405 of the fitting 106 to the valve housing 105.

Figure 6:
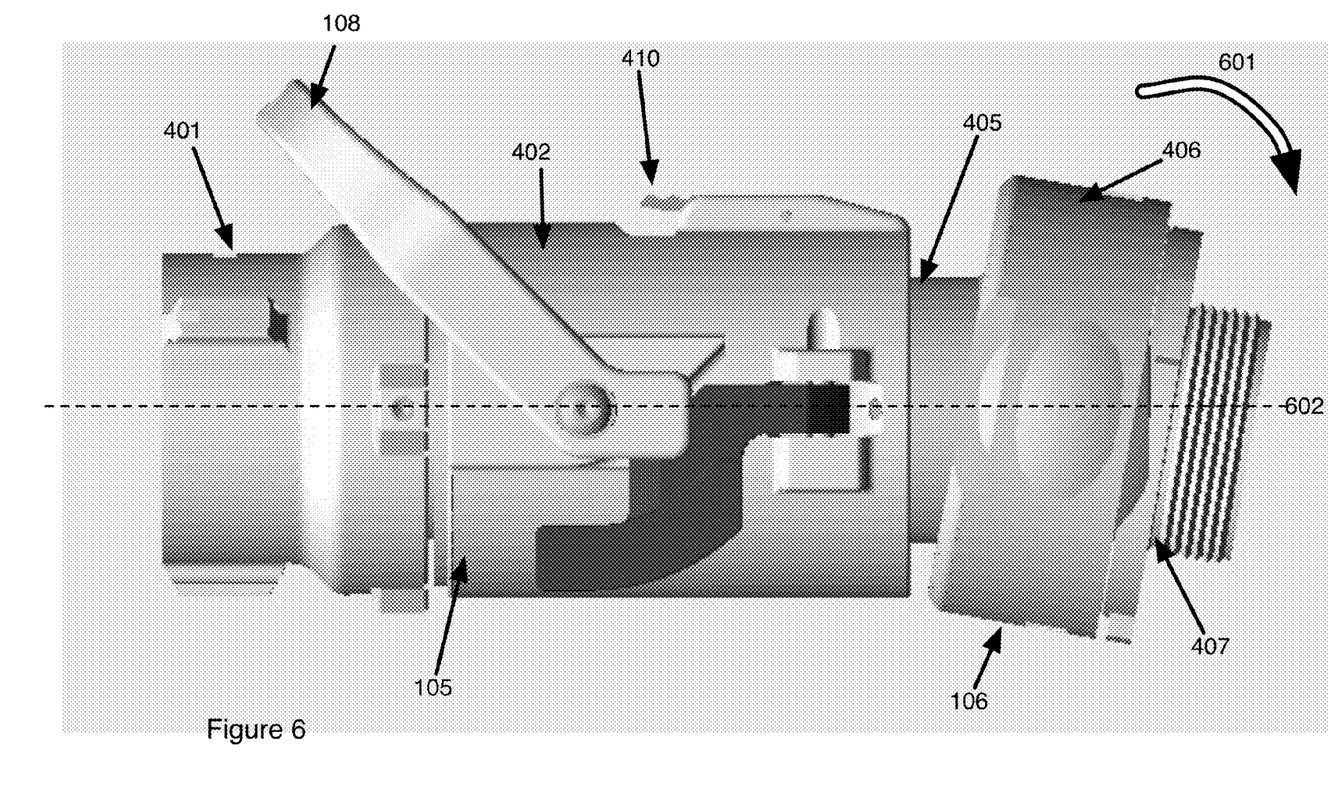
FIG. 6 shows the embodiment of FIG. 5 and demonstrates a tilt feature of the fire engine hose connector.
Figure 7:
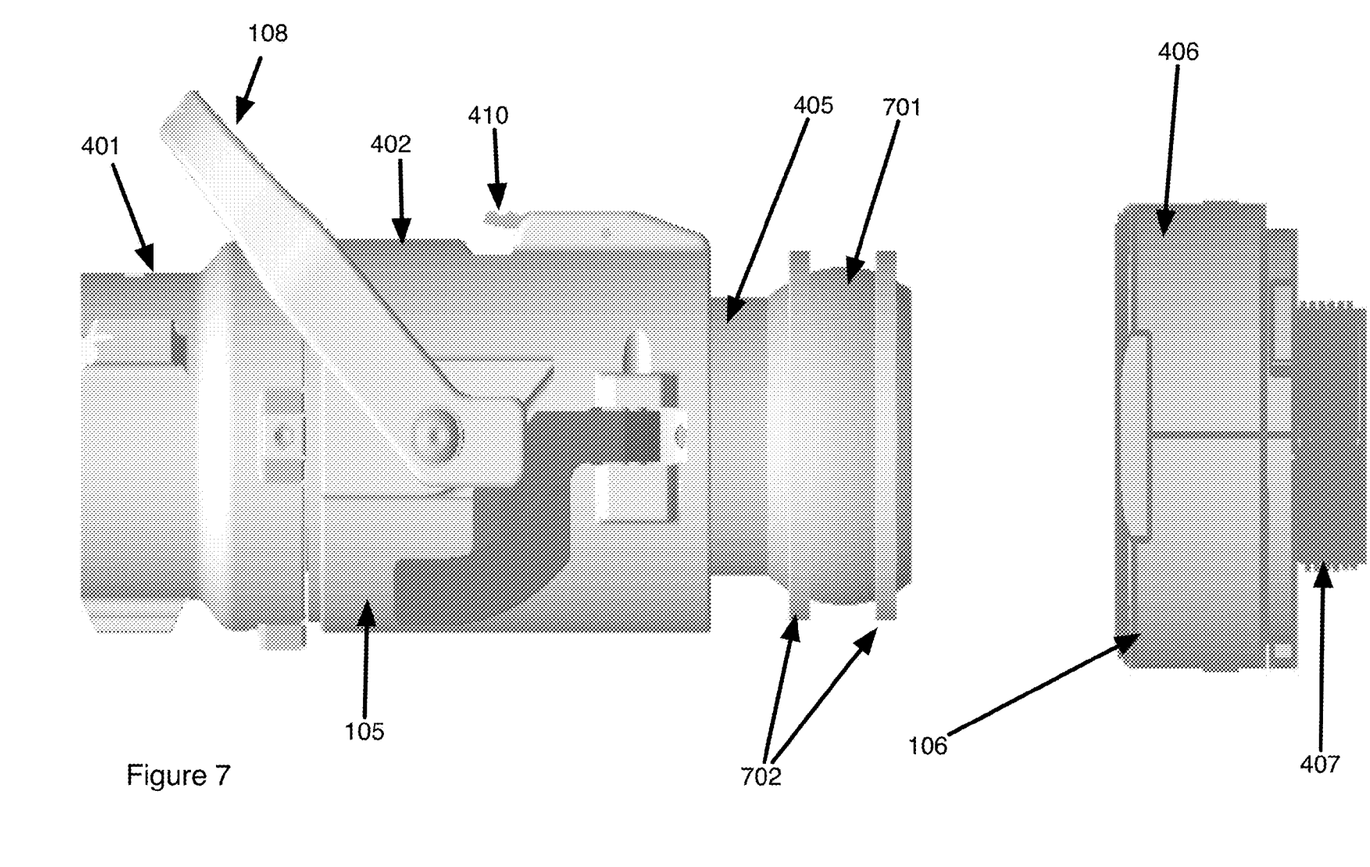
FIG. 7 shows an exploded view of the tilt feature parts of the fire engine hose connector.

FIG. 6 shows the tilt capabilities of the connector 106. The interior of the connector (visible in subsequent drawings) includes a ball connector sealed to the housing 406 with o-rings that allows motion 601 of the housing and the attached connector 407 relative to the axis 602 of the fire engine hose connector. The connection between the connector 106 and the housing 105 allows the bending motion in all directions relative to the axis 602. That is, into and out of the plane of the figure as well as up and down within the plane of the figure as shown, and any direction as a combination of those two. The ball connector within the housing 406 is held in place by screwing the connector end 407 into the housing 406. The torque applied to screwing fitting 407 into housing 406 determines the ease of the motion and when fully tightened locks the housing at any selected displacement 601. FIG. 7 shows an exploded view of the interior ball connector 701 and the o-ring seals 702 that are contained within the housing 406 that enable the motion described in FIG. 6.

Figure 8:
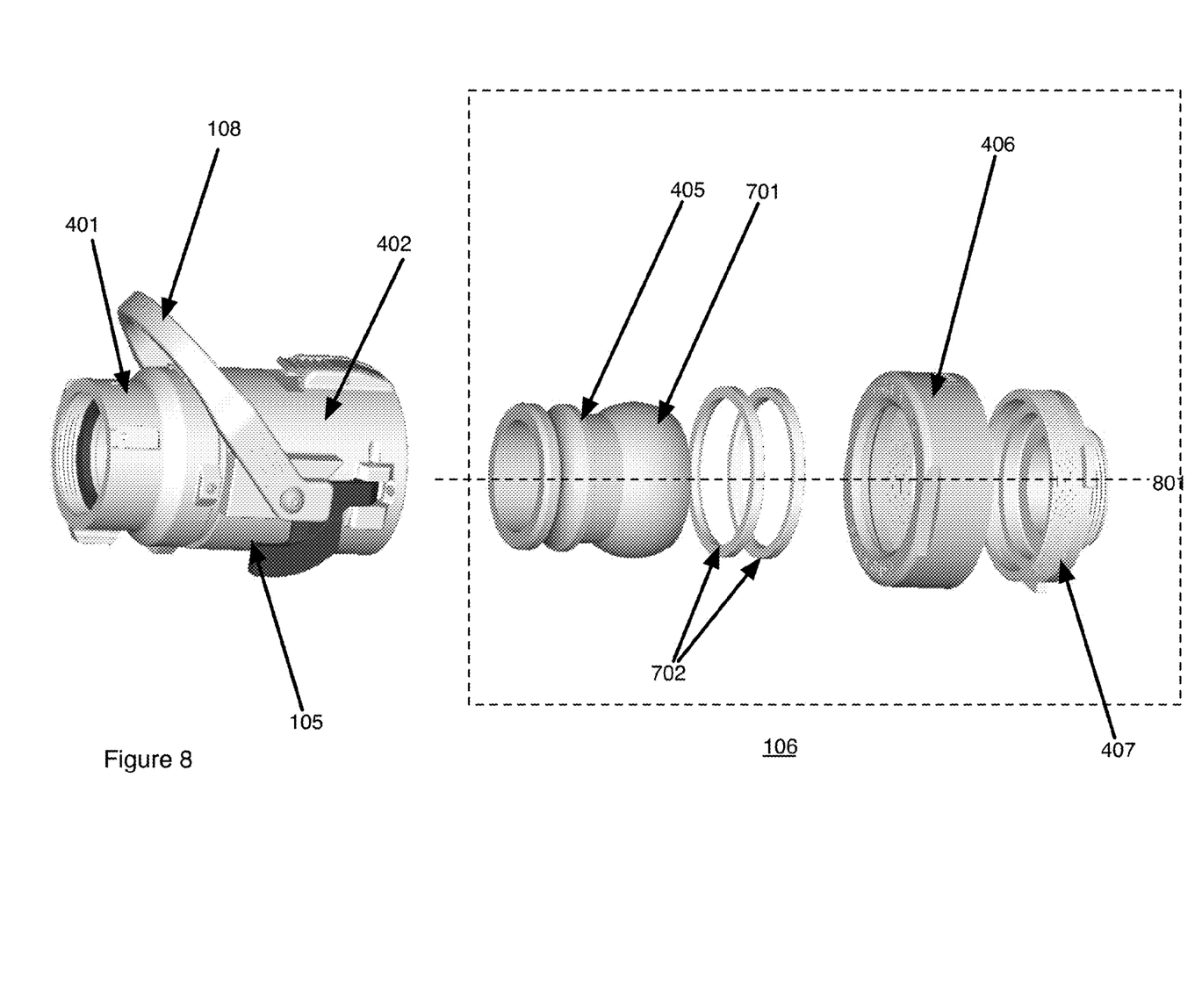
FIG. 8 shows a second exploded view of the fire engine hose connector showing the quick disconnect fitting and the tilt feature parts of the fire engine hose connector.

FIG. 8 shows an explode view of the connector 106. The connector 106, enclosed in the dashed rectangle is comprised of male quick disconnect connector 405 a ball connector 701 o-rings 702 a housing 406 and a threaded adapter 407. The ball connector 701 fits within the housing 406 and is clamped in place using the threaded adapter 407. The housing and threaded connector 406, 407 can bend perpendicular to the axis 801. The torque applied when screwing the connector 407 into the housing 406 determines the ease of this movement and when fully tightened can lock the housing and threaded adapter 406, 407 at a selected angle.

Figure 9:
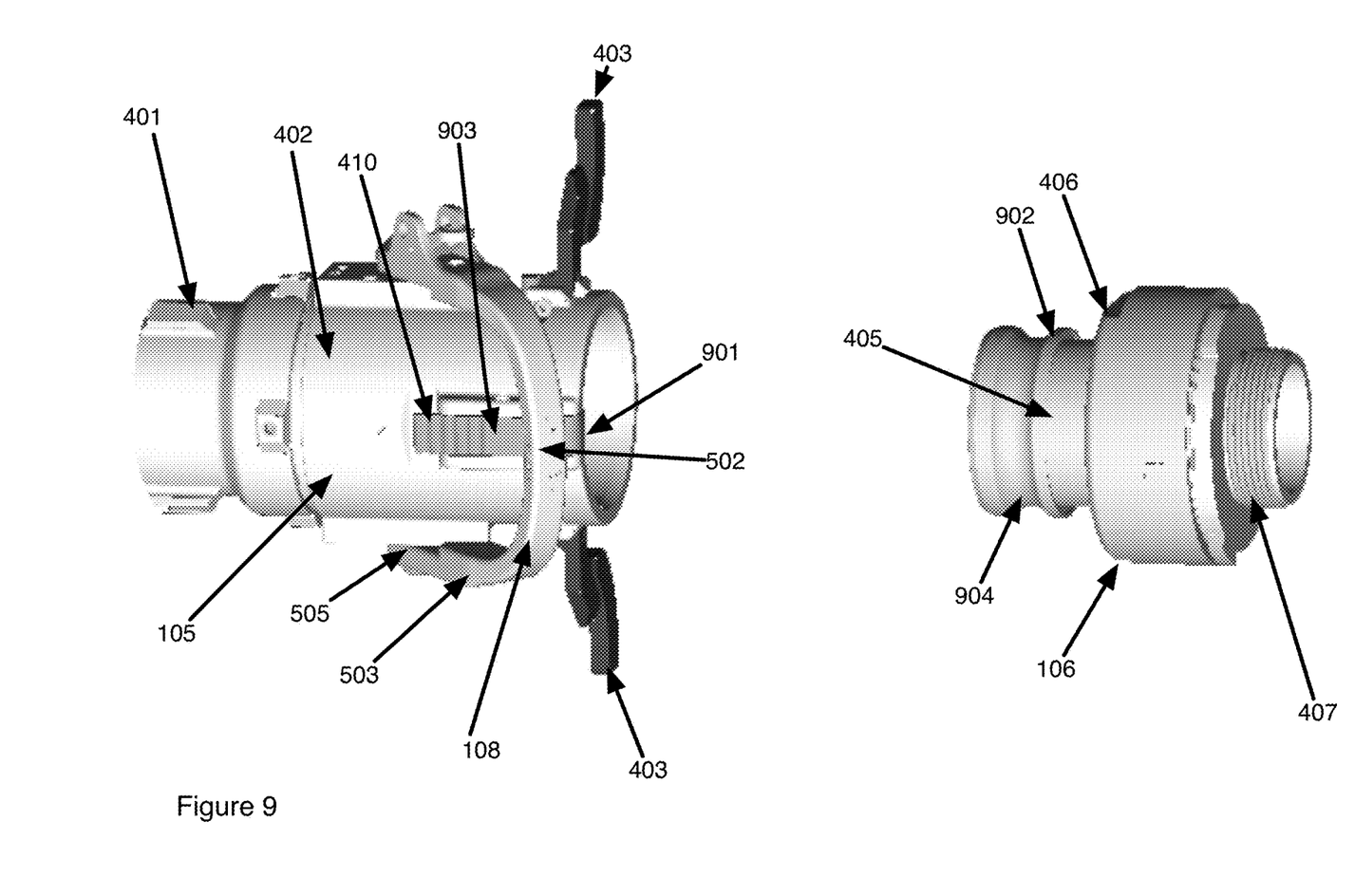
FIG. 9 shows a top view of the fire engine hose connector showing the quick disconnect feature separated from the valve body.

FIG. 9 shows a top view of the fire engine hose connector with the connector piece 106 disconnected from the valve housing piece 105. The valve handle 108 is in the closed position and the locking levers 403 are in the open position thereby releasing the quick disconnect 405 from the valve housing 105. When the quick disconnect is inserted into the housing 105 and the locking levers 403 (shown in previous drawings) are rotated to the closed position the locking levers rotate a rounded end that extends into the housing 105 and engages the circular depression 904 on the quick disconnect and locks the quick disconnect inside the valve housing 105. The fire engine hose connector further includes a spring loaded lever that has a pivot point 903 and a press point 410 such that when depressed lifts the hooked end 901 to release it from latching onto the ridge 902. When the connector 106 is inserted into the housing and the press point 410 is released the spring (not shown) causes the hooked end 901 to move towards the interior of the valve housing and thereby prevents removal of the connector 106 from the housing by hooking onto the ridge 902. This provides a safety catch that works in two instances. If the quick disconnect latches 403 are released without relieving the interior water pressure, the latch 403 will prevent the fire engine hose connector valve housing 105 from violently disconnecting from the connector 106. The water pressure will be released through the gap formed between the valve housing 105 and the connector 106. Additionally, during the disconnect operation the water pressure within the fire engine hose connector is first relieved, the latch will still hold the fire hose and valve housing in contact with the connector until the release 410 is pushed thereby allowing a controlled motion to remove the fire hose and valve housing 105 from the connector.

Figure 10:
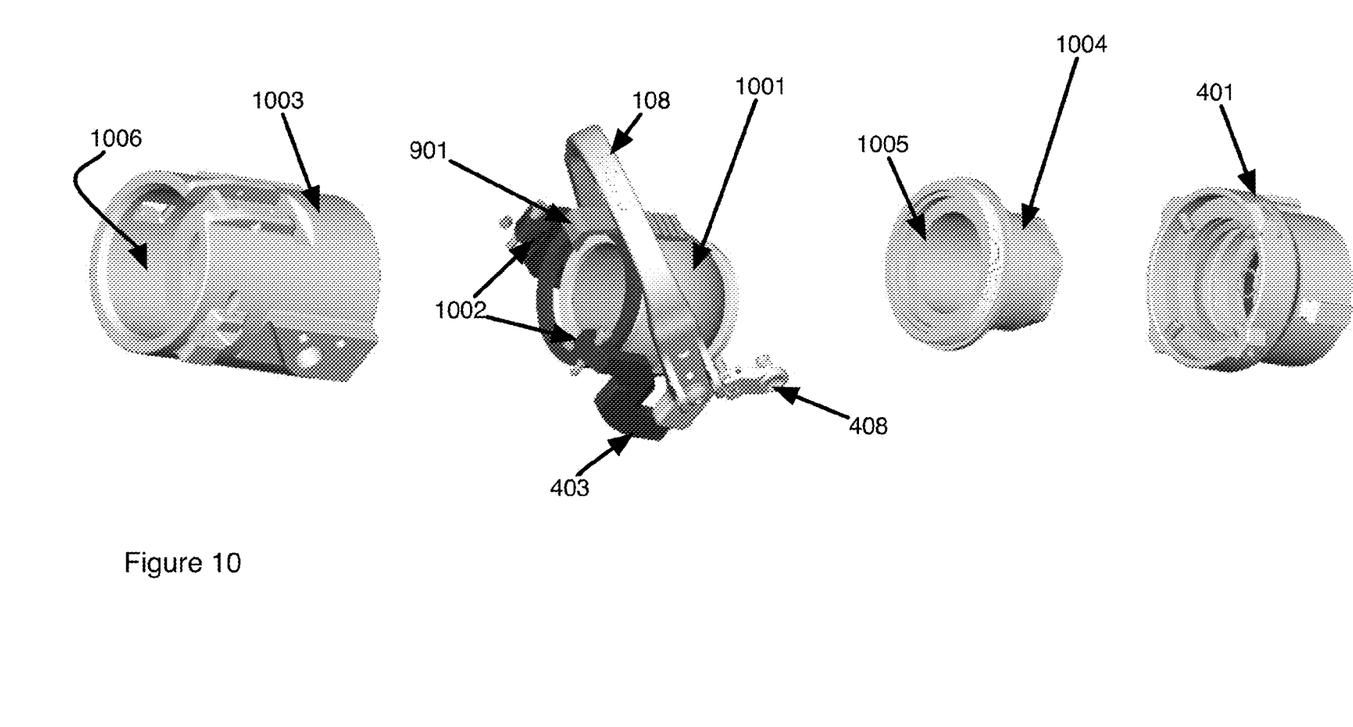
FIG. 10 shows a perspective exploded view of the fire engine hose connector valve body.

FIG. 10 shows an exploded view of the interior components of the valve housing 105 component of the fire engine hose connector. The valve housing component of the fire engine hose connector includes a cylindrical housing 1003. The ball valve 1001 fits within the housing 1003 and includes seals for a water tight fit. The ball valve is actuated by movement of the U-shaped handle 108 The latches 403 for the quick disconnect (not shown) include the rounded ends 1002 that engage the circular depression in the quick disconnect when the latches are in the closed position as shown. When the latches 403 are rotated away from the housing 105 the rounded ends are rotated away from the quick disconnect and the quick disconnect is released. In use the quick disconnect fits into the near 1006 end of the housing. The opposite end of the interior components include an adapter 1004 that includes a seat 1005 for the ball valve 1001 and further attaches to the the connector 401 to which a fire hose is attached when in use.

FIGS. 1-10 have illustrated a fire engine hose connector. To summarize the features:

A fire engine hose connector 105, 106 comprising:
  a cylindrical valve housing 105 having a first end 401 with an adapter for connecting to a fire hose connector and a second end 411 comprising a female quick disconnect connector, and,
  a connector 106, the connector comprising:
    a cylindrical fitting having a first end 405 that is a male quick disconnect connector that fits the female quick disconnect connector on the cylindrical valve housing, and, a second end 701 that includes a ball fitting, and, a housing 406 that contains the ball fitting and includes a threaded fitting 407 that accepts an adapter for connection to a water intake manifold, and, the ball fitting 701 fit into the housing such that the cylindrical fitting can be displaced perpendicular relative to the axis of the connector (see FIG. 6), and, the threaded fitting holding the ball fitting within the housing and the threaded fitting screwed into the housing and locking the cylindrical fitting at the displaced position, and, the cylindrical valve housing further including:

a ball valve 1001 enclosed within the cylindrical valve housing 402, and, a U-shaped handle 108 attached to the outside of the cylindrical valve housing 402 with the bottom of the U 502 extending away from the cylindrical housing, and, the top ends 505 of the U pivotally attached 504 on either side of the cylindrical valve housing and connected through the housing to rods that attach to the ball valve such that ball valve is opened and closed as the U-shaped handle is pivoted to and fro (see FIGS. 4 and 5), and, a pressure relief valve built into one side of the cylindrical valve housing, the pressure relief valve actuated by a spring loaded button 408 on the exterior of the housing, a pair of latching handles 403 pivotally attached to opposite sides on the outside of the cylindrical housing, the latching handles actuating a locking mechanism such that when the handles are rotated inward towards the cylindrical valve housing they are positioned against the body of the cylindrical housing they lock the male quick disconnect fitting into the female quick disconnect fitting, and, the pressure relief button located such that if the U-shaped handle is pivoted to a position to open the ball valve a side arm of the U-shaped handle blocks access to the pressure relief valve, and, the pair of latching handles each including an indentation 507, and, when the U-shaped handle is pivoted to a position to open the ball valve the ends of the U-shaped handle overlap the indentations and lock the latching handles in position against the cylindrical valve housing (see FIG. 5).

Those skilled in the art will appreciate that various adaptations and modifications of the preferred embodiments can be configured without departing from the scope and spirit of the invention. Therefore, it is to be understood that the invention may be practiced other than as specifically described herein, within the scope of the appended claims.

SUMMARY

A fire engine hose connector system and a method for using the system are reported. The system allows for rapid connection between the fire hose and the fire engine, and more importantly the system enables even more rapid disconnection. The fire engine and firefighting personnel may make a rapid escape form an overtaking wildfire. The ability to rapidly disconnect and escape from the fire scene allows the fire engine and personnel to access hydrant supplies that would otherwise not be available due to safety procedures that preclude connection when the long disconnect time requirements of prior art connectors place the escape of the fire engine and personnel at risk in a rapidly moving fire. The connector further includes a means to bend the connector for stress relief and ease of handling and multiple safety interlocks.

I claim:

1. A fire engine hose connector comprising:
   a) a cylindrical valve housing having a first end with an adapter for connecting to a fire hose connector and a second end comprising a female quick disconnect connector, and,
   b) a swivel connector, the swivel connector comprising:
      (1) a cylindrical fitting having a first end that is a male quick disconnect connector that fits the female quick disconnect connector on the cylindrical valve housing, and, a second end that includes a ball fitting, and, an axis that extends from the first end of the cylindrical fitting to the second end of the cylindrical fitting, and,
      (2) a swivel connector housing that contains the ball fitting and includes a threaded fitting that accepts an adapter for connection to a water intake manifold, and,
      (3) the ball fitting fit into the swivel connector housing such that the threaded fitting can be displaced perpendicular relative to the axis of the cylindrical fitting, and,
      (4) the threaded fitting holding the ball fitting within the swivel connector housing and the threaded fitting, when screwed into the swivel connector housing, locks the threaded fitting at the displaced position, and,
   c) the cylindrical valve housing further including:
      i) a ball valve enclosed within the cylindrical valve housing, and,
      ii) a U-shaped handle attached to the outside of the cylindrical valve housing with the bottom of the U extending away from the cylindrical valve housing, and, top ends of the U pivotally attached on either side of the cylindrical valve housing and connected through the cylindrical valve housing to rods that attach to the ball valve such that ball valve is opened and closed as the U-shaped handle is pivoted to and fro, and,
      iii) a pressure relief valve built into one side of the cylindrical valve housing, the pressure relief valve actuated by a spring loaded button on the exterior of the cylindrical valve housing, the pressure relief button located such that if the U-shaped handle is pivoted to a position to open the ball valve a side arm of the U-shaped handle blocks access to the pressure relief valve.

2. The fire engine hose connector of claim 1 further including a pair of latching handles pivotally attached to opposite sides on the outside of the cylindrical valve housing, the latching handles actuating a locking mechanism such that when the latching handles are rotated inward towards the cylindrical valve housing they are positioned against the body of the cylindrical valve housing they lock the male quick disconnect connector into the female quick disconnect connector, and, the pair of latching handles each including an indentation, and, when the U-shaped handle is pivoted to a position to open the ball valve the top ends of the U-shaped handle overlap the indentations and lock the latching handles in position against the cylindrical valve housing.

* * * * *